July 28, 1942.　　O. E. STAPLES ET AL　　2,291,508
HOBBING MACHINE
Filed May 5, 1939　　3 Sheets-Sheet 3
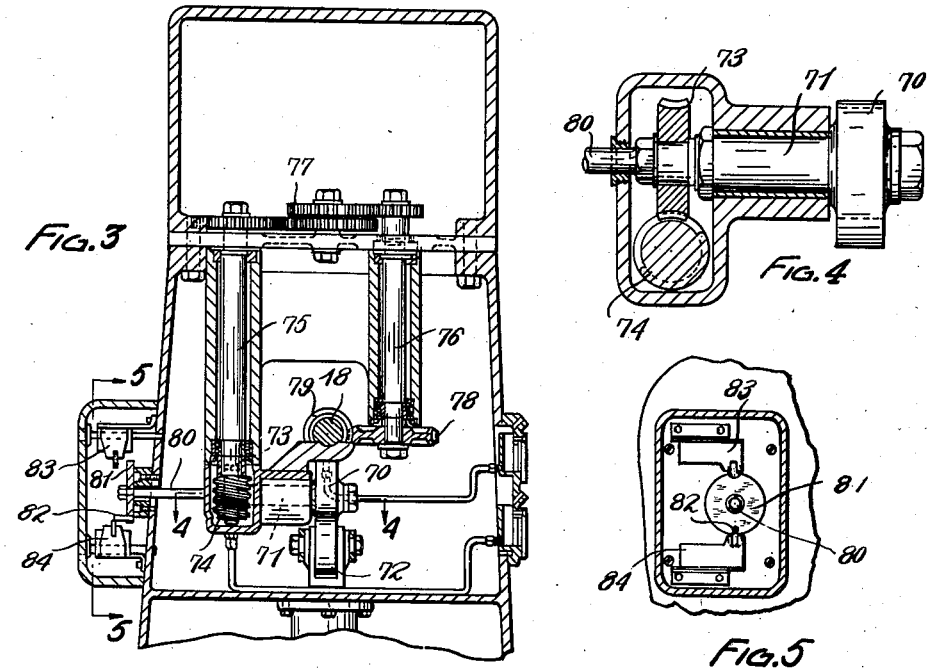
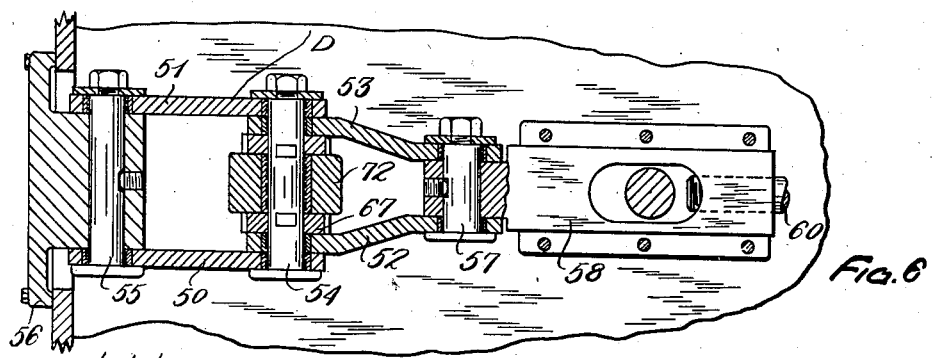
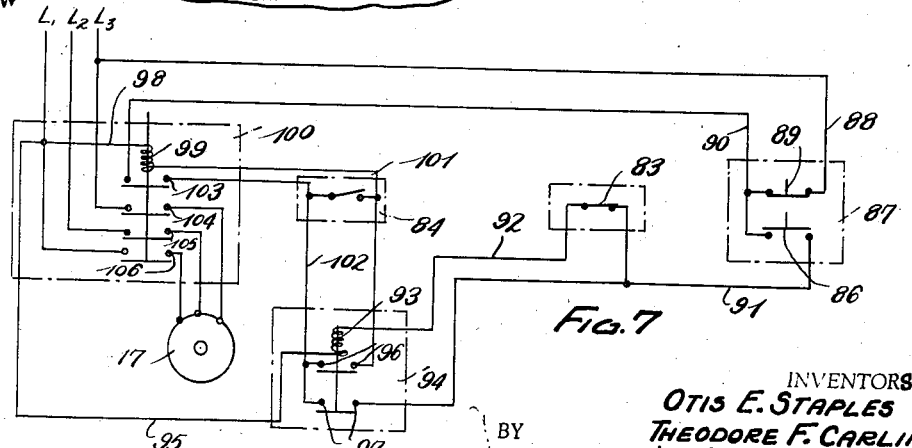
INVENTORS
OTIS E. STAPLES
THEODORE F. CARLIN
BY Kwis Hudson & Kent
ATTORNEYS Patented July 28, 1942

2,291,508

UNITED STATES PATENT OFFICE 2,291,508

HOBBING MACHINE

Otis E. Staples, Euclid, and Theodore F. Carlin, Cleveland, Ohio, assignors to The Cleveland Hobbing Machine Company, Cleveland, Ohio, a corporation of Ohio Application May 5, 1939, Serial No. 271,918

3 Claims. (Cl. 90—4)

The present invention relates to machine tools and more particularly to hobbing machines for cutting gears.

An object of the present invention is the provision of a novel and improved hobbing machine for cutting gears wherein a toggle mechanism is employed to produce a relative movement between the tool and head in a direction normal to the axis of the work during the cutting operation.

The present invention resides in certain details of construction and combinations and arrangements of parts and further objects and advantages thereof will be apparent to those skilled in the art to which the invention relates from the following description of the preferred embodiment thereof described with reference to the accompanying drawings forming a part of this specification in which similar reference characters designate corresponding parts throughout the several views and in which:

Fig. 3 is a section approximately on the line 3—3 of Fig. 2, with portions in elevation;

Fig. 4 is a section approximately on the line 4—4 of Fig. 3, with portions in elevation;

Fig. 5 is a section approximately on the line 5—5 of Fig. 3;

Fig. 6 is a section approximately on the line 6—6 of Fig. 2, with portions in elevation; and Fig. 7 is a wiring diagram of the electrical control for the machine.

Figure 1:
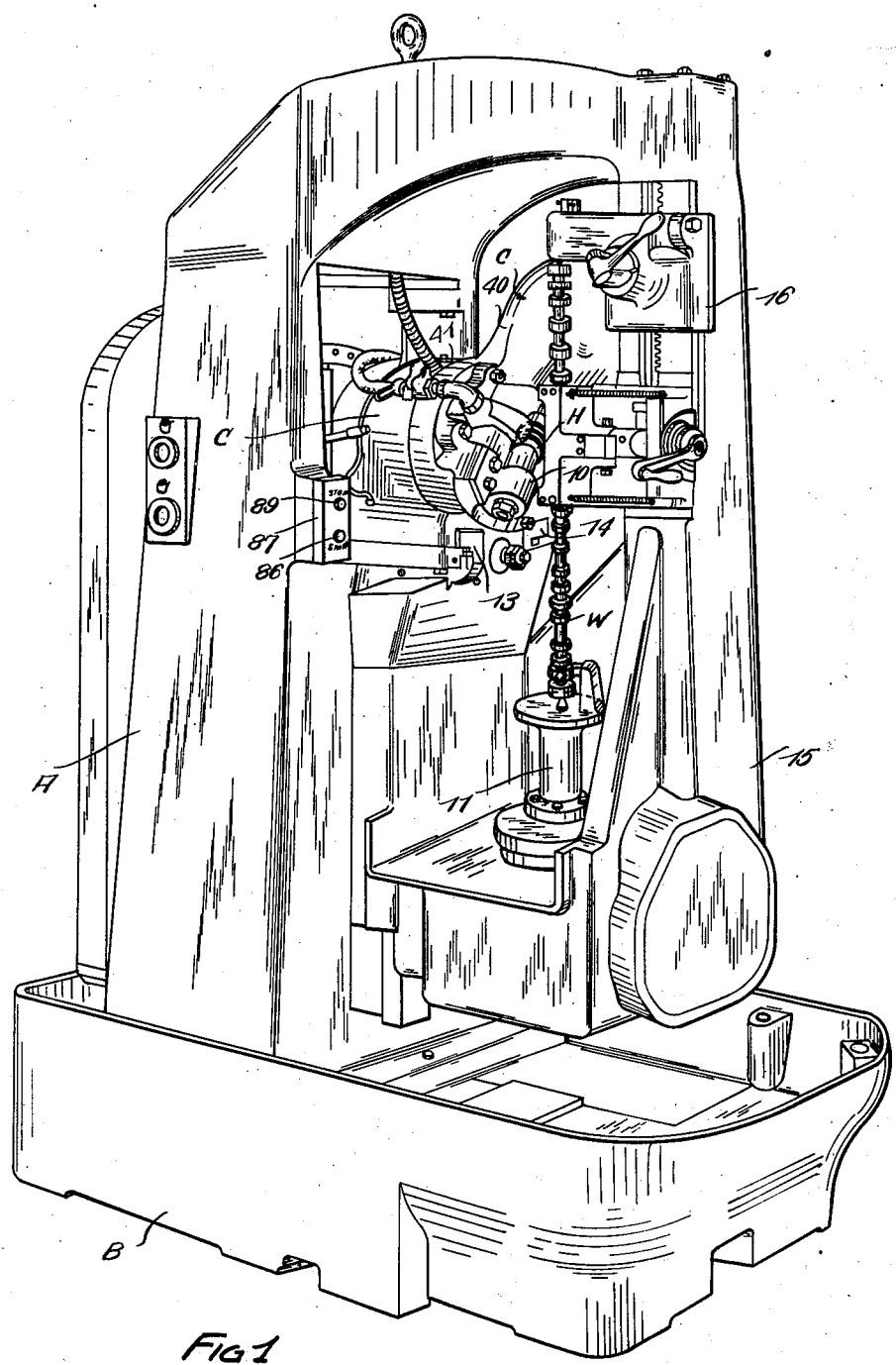
Fig. 1 is a perspective view of a hobbing machine embodying the present invention.

Although the invention is susceptible of being embodied in various constructions, it is herein shown and described as embodied in a single spindle hobbing machine of generally vertical construction.

Referring to the drawings, the machine shown therein comprises a frame A including a base B which serves as a sump for the cutting fluid, etc. Generally speaking, the machine comprises a hob spindle 10 rotatably supported in a hob head, designated generally as C, and adapted to support a hob H, a work spindle 11 between the upper end of which and a tail center 12 the work W is supported, and means for rotating the hob and work spindles 10 and 11, respectively, in predetermined timed relation. The hob head C which is slidably supported on horizontal ways 13 and 14 is formed integral with the frame A and is adapted to be reciprocated towards and from the work in a manner hereinafter more specifically referred to.

Figure 2:
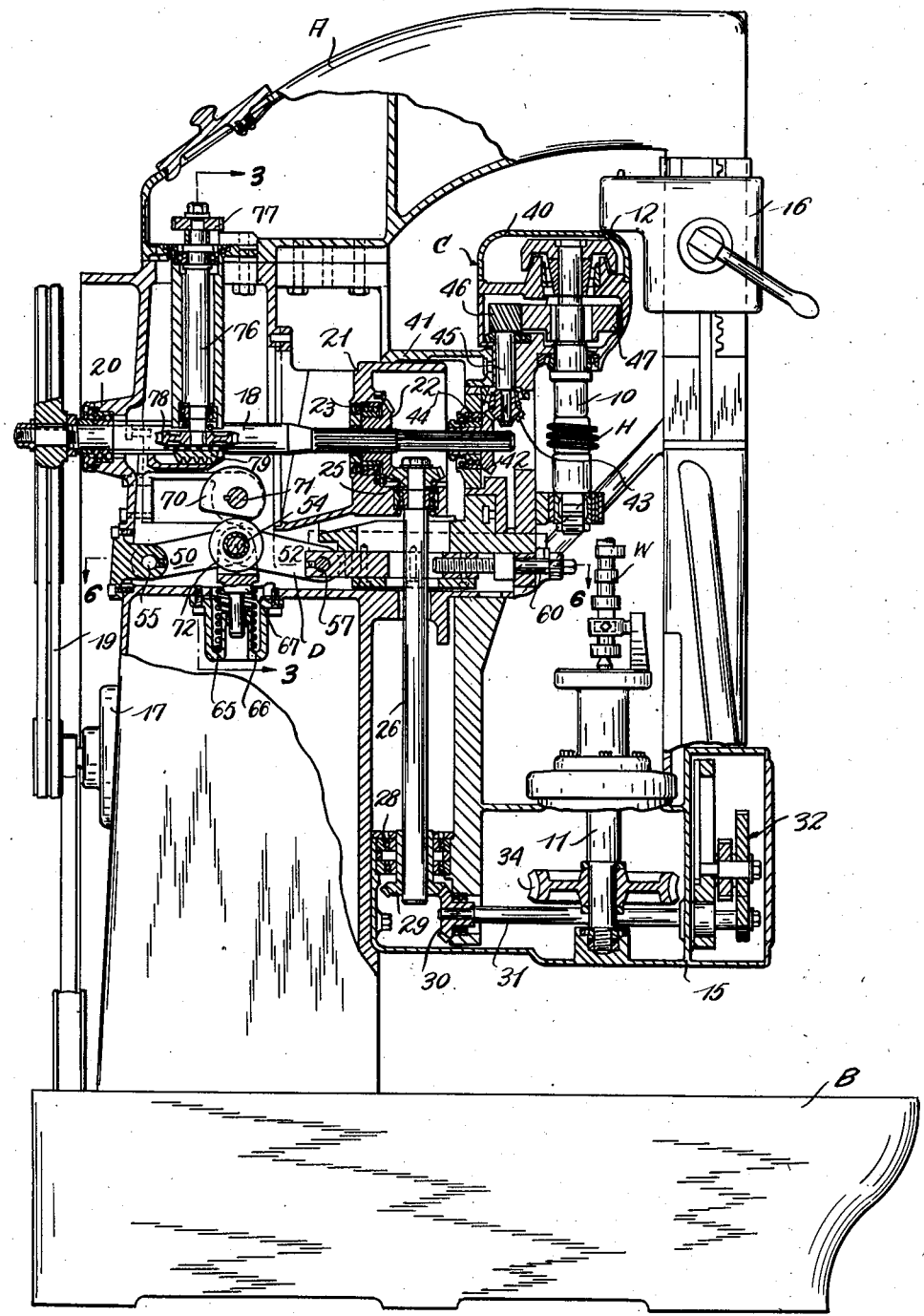
Fig. 2 is a side elevational view of the hobbing machine shown in Fig. 1, with certain parts omitted and portions in section on the center line of the machine.

The work spindle 11 is rotatably supported in a part 15 of the frame A, which also carries the tail stock 16. The tool and work spindles 10 and 11 are adapted to be rotated by a motor 17 housed within the frame A and operatively connected to a horizontal shaft 18 through the medium of a flexible drive connection designated generally as 19. The left-hand end of the shaft 18, as viewed in Fig. 2, is rotatably supported in a boss 20 formed integral with the frame A and the right-hand end thereof as viewed in the same figure, is rotatably supported in a member 21 bolted to and forming a part of the frame A through the medium of a bevel gear 22 having an elongated hub splined on the shaft 18. The hub of the gear 22 is rotatably supported in the member 21 through the medium of an anti-friction bearing 23. The bevel gear 22 is one of a pair of miter gears, the other gear 25 of which is fixed to the upper end of a vertical shaft 26 rotatably supported in the member 21, previously mentioned, by anti-friction bearings. The lower end of the shaft 26 is rotatably supported in the frame A through the medium of anti-friction bearings 28 and has a bevel gear 29 fixed thereto. The gear 29 is one of a pair of miter gears, the other gear 30 of which is fixed to the rear end of a horizontal shaft 31 rotatably supported in the part 15 of the frame A. The shaft 31 is operatively connected to the work spindle 11 through the medium of change gears, designated generally by the reference character 32, operatively connected thereto and to a worm and worm shaft (not shown), the worm of which is continuously in mesh with a worm wheel 34 fixed to the work spindle 11.

The hob spindle 10 is rotatably supported in a member 40 movably secured to a member 41 for angular adjustment about an axis concentric with the axis of the shaft 18. The member 41 is in turn slidably supported on the horizontal ways 13 and 14. The rear end of the member 41 has a telescopic engagement with the member 21 which prevents the entrance of chips, etc. into the gearing etc. The hob spindle 10 is operatively connected to the shaft 18 by miter gears 42 and 43, the former of which is provided with an elongated hub through the medium of which it is rotatably supported by anti-friction bearings 44 in the member 41. The gear 43 is fixed to one end of a short shaft 45 rotatably supported in the member 40, the other end of which shaft is provided with a gear 46 continuously in mesh with a gear 47 keyed to the hob spindle 10. The hob head thus far described is similar in construction to the hob head shown in our copending application Serial No. 195,062, now Patent No. 2,154,056, to which reference is made for a complete description thereof.

According to the provisions of the present invention, the hob head C together with the hob are moved towards the work during the cutting operation. In the preferred embodiment of the invention shown, this movement is accomplished by a toggle mechanism, designated generally as D, and comprising two pairs of links 50, 51 and 52, 53 pivotally connected together by a pin or bolt 54 to form the hinge or knuckle of the toggle. The opposite ends of the links 50, 51 are pivotally connected to a pin 55 fixed in a member 56 detachably secured to the frame A. The right-hand ends of the links 52, 53, as viewed in Figs. 2 and 6, are pivotally connected to a pin 57 fixed in a member 58 adjustably connected to the member 41 through the medium of a screw 60 rotatably supported in the member 41 against axial movement therein and having threaded engagement with the member 58. The hinge or knuckle of the toggle D is continuously urged in an upward direction, as viewed in Fig. 2, by a compression spring 65, the lower end of which projects into a cup-shaped member 66 fixed to the frame A while the upper end thereof engages a member 67, the upper forked end of which is pivotally connected to the pin 54. The hinge or knuckle of the toggle D is adapted to be moved in a downward direction against the spring 66 by a cam 70 keyed to a shaft 71 rotatably supported in the frame A and continuously in engagement with a roller 72 carried by the pin 54. As the pin 54 of the toggle is moved in a downward direction by the cam 70, the hob head C together with the hob are moved along the horizontal ways 13 and 14 towards the work. The upward movement of the pin 54 under the action of the spring 65, which returns the hob head to its starting position, is also under the control of the cam 70.

The shaft 71 is rotated in timed relation to the rotation of the work spindles through a worm wheel 73 keyed thereto, which worm wheel is continuously in mesh with a worm 74 fixed to the lower end of a vertical shaft 75 rotatably supported in the frame A. The upper end of the shaft 75 is operatively connected to the upper end of a second vertical shaft 76 also rotatably supported in the frame A, through change gears designated generally as 77. The lower end of the shaft 76 is provided with a worm wheel 78 continuously in mesh with a worm 79 keyed to the shaft 18.

The reduced left-hand end 80 of the shaft 71, as viewed in Fig. 3, projects to the right of the frame A and the end thereof is provided with a crank or disk 81 carrying a pin 82 adapted to periodically actuate a pair of limit switches 83 and 84 in such a manner that the motor 16 will stop upon the completion of one cycle of operation of the machine. In operation, the disk 81 makes one revolution for each operating cycle of the machine. The motor is started by pushing the start push button 86 of the stop-start push button switch 87 mounted in an accessible position on the frame of the machine.

Referring to the wiring diagram, which is Fig. 7 of the drawings, the operation of the machine is as follows: At the beginning of the cycle of operation, the parts are in the position shown in the drawings, and the limit switch 84 is held open by the pin 82. After a work blank has been positioned between the work spindle 11 and the tail stop 12, the operator starts the machine by depressing the start push button 86 of the stop-start push button switch 87, establishing a circuit from the line L—3 through the line 88, stop push button switch 89, line 90, start push button switch 86, line 91, normally closed limit switch 83, wire 92, operating solenoid 93 of relay 94, and line 95 to L—1. Energization of the operating solenoid 93 of relay 94 closes the normally open contacts 96 and 97 thereof. Upon the closing of contacts 96 and 97 of the relay 94, a circuit is established from the line L—1 through line 98, operating solenoid 99 of the motor control panel 100, line 101, upper contacts 96 of relay 94, line 102, lower contacts 97 of relay 94, line 91, start push button switch 86, line 90, stop push button switch 89, and line 88 to L—3, energizing the operating solenoid 99 of motor control panel 100 and closing the normally open contacts 103, 104, 105 and 106 thereof. Upon the closing of contacts 104, 105 and 106, the motor 17 of the machine is started.

The closing of the normally open holding-in contacts 103 of motor control panel 100 establishes a holding-in circuit for the operating solenoid 93 of the relay 94 from the line L—3 through the line 88, stop push button switch 89, line 90, normally open holding-in contacts 103 which are now closed, line 102, normally open contacts 97 of relay 94, line 91, normally closed limit switch 83, line 92, operating solenoid 93 of relay 94, and line 95 to L—1. The normally open holding-in contacts 103 which are now closed also maintain the circuit through the operating solenoid 99 of the motor control panel 100 after the normally open start push button 86 is released. This circuit is from the line L—3 through wire 88, stop push button switch 89, line 90, holding-in contacts 103, line 102, upper contacts 96 of relay 94, line 101, operating solenoid 99, and line 98 to L—1.

Shortly after the motor 17 has been started, the pin 82 moves away from the limit switch 84 allowing the same to close. This limit switch which is connected in shunt circuit with the upper contacts 96 of the relay 94, maintains the circuit to the operating solenoid 99 of the motor control panel 100 after the contacts 96 of the relay 94 open upon de-energization of the operating solenoid 93 of the relay 94 which occurs when the pin 82 opens the normally closed limit switch 83. In the present instance, this occurs when the machine is half-way through its cycle of operation. The limit switch 83 remains open only for a short interval of time but in the interim the solenoid 93 has been de-energized and the contacts 97 opened and when the limit switch 83 again closes the circuit through the operating coil 93 of relay 94 will not be established. When the machine has completed its cycle of operation, the pin 82 actuates the normally closed limit switch 84 to open the circuit therethrough. This de-energizes the operating solenoid 99 of motor control panel 100, allowing the contacts thereof to open stopping the motor 17. During the interim the hob has been fed into the desired depth and returned to its starting position. The cycle of operation can be repeated by merely depressing the start push button 86 a second time. The motor 17 can be stopped at any time by depressing the stop push button 89.

In the preferred embodiment of the invention shown, the pivots 55 and 57 for the toggle links are located in a horizontal plane. However, it will be apparent that the left-hand pivot 55 may be raised considerably above the right-hand pivot 57, in which event the toggle mechanism, in addition to reciprocating the hob head towards and from the work, will exert a pressure thereon tending to hold the same down on the ways 13 and 14. Ordinarily this is not necessary but in some instances may be found advisable.

While the preferred embodiment of the invention has been described with considerable detail, we do not wish to be limited to the particular construction shown, which may be varied within the scope of this invention and it is our intention to cover hereby all adaptations, modifications and uses thereof which come within the practice of those skilled in the art to which the invention relates, and we particularly point out and claim as our invention the following:

1. A hobbing machine of the character referred to comprising a work spindle, a tool spindle, toggle mechanism for producing relative movement between said spindles in a direction normal to the axis of rotation of the work spindle, means for continuously exerting a yieldable lateral pressure on the knuckle of said toggle in one direction, a cam for moving the knuckle of said toggle in the opposite direction, interconnecting gearing between said spindles and said cam, an electric motor for driving said gearing whereby said spindles and said cam are rotated in timed relation, means for closing the circuit to said electric motor, and means for automatically opening the circuit to said motor at a predetermined point in the relative movement of said spindles.

2. A hobbing machine of the character referred to comprising a frame, a work spindle, means for rotatably supporting said work spindle in said frame, a tool head, means for slidably supporting said tool head on said frame for movement in a direction normal to the axis of rotation of the work spindle, a tool spindle, means for rotatably supporting said tool spindle in said tool head, toggle mechanism for moving said tool head whereby a relative movement is produced between said spindles in a direction normal to the axis of rotation of the work spindle, means for continuously exerting a yieldable lateral pressure on the knuckle of said toggle in one direction, a cam for moving the knuckle of said toggle in the opposite direction, interconnecting gearing between said spindles and said cam, and means for driving said gearing whereby said spindles and said cam are rotated in timed relation.

3. A hobbing machine of the character referred to comprising a frame, a vertical work spindle, means for rotatably supporting said work spindle in said frame, a tool head, means for slidably supporting said tool head on said frame for movement in a direction normal to the axis of rotation of the work spindle, a tool spindle, means for rotatably supporting said work spindle in said frame, a tool head, means for slidably supporting said tool head on said frame for movement in a direction normal to the axis of rotation of said work spindle, toggle mechanism for moving said tool head, means for continuously exerting a yieldable lateral pressure on the knuckle of said toggle in one direction, a cam for moving the knuckle of said toggle in the opposite direction, interconnecting gearing between said spindles and said cam, an electric motor for driving said gearing whereby said spindles and said cam are rotated in timed relation, means for closing the circuit to said electric motor, and means for automatically opening the circuit to said motor at a predetermined point in the movement of said tool head.

THEODORE F. CARLIN.
OTIS E. STAPLES.